United States Patent

Wu et al.

[11] Patent Number: 5,987,256
[45] Date of Patent: Nov. 16, 1999

[54] SYSTEM AND PROCESS FOR OBJECT RENDERING ON THIN CLIENT PLATFORMS

[75] Inventors: Bo Wu; Ling Lu, both of San Jose, Calif.

[73] Assignee: Enreach Technology, Inc., San Jose, Calif.

[21] Appl. No.: 08/922,898

[22] Filed: Sep. 3, 1997

[51] Int. Cl.$^6$ .................................................. G06F 9/45
[52] U.S. Cl. ............................................................ 395/707
[58] Field of Search .............................................. 395/707

[56] References Cited

U.S. PATENT DOCUMENTS

| | | | |
|---|---|---|---|
| 5,504,917 | 4/1996 | Austin et al. | 345/522 |
| 5,513,127 | 4/1996 | Gard et al. | 395/200.53 |
| 5,551,015 | 8/1996 | Goettelmann et al. | 395/707 |
| 5,586,020 | 12/1996 | Isozaki | 395/707 |
| 5,826,089 | 10/1998 | Ireton | 395/707 |

OTHER PUBLICATIONS

Blickstein et al. The GEM optimizing compiler system; Digital Technical Journal vol. 4 No. 4 Special Issue 1992 pp. 121–136.

*Primary Examiner*—Robert W. Downs
*Assistant Examiner*—Wei Zhen
*Attorney, Agent, or Firm*—Wilson Sonsini Goodrich & Rosati

[57] ABSTRACT

A system for processing an object specified by an object specifying language such as HTML, JAVA or other languages relying on relative positioning, that require a rendering program utilizing a minimum set of resources, translates the code for use in a target device that has limited processing resources unsuited for storage and execution of the HTML rendering program, JAVA virtual machine, or other rendering engine for the standard. Data concerning such an object is generated by a process that includes first receiving a data set specifying the object according to the object specifying language, translating the first data set into a second data set in an intermediate object language adapted for a second rendering program suitable for rendering by the target device that utilizes actual target display coordinates. The second data set is stored in a machine readable storage device, for later retrieval and execution by the thin client platform.

14 Claims, 11 Drawing Sheets

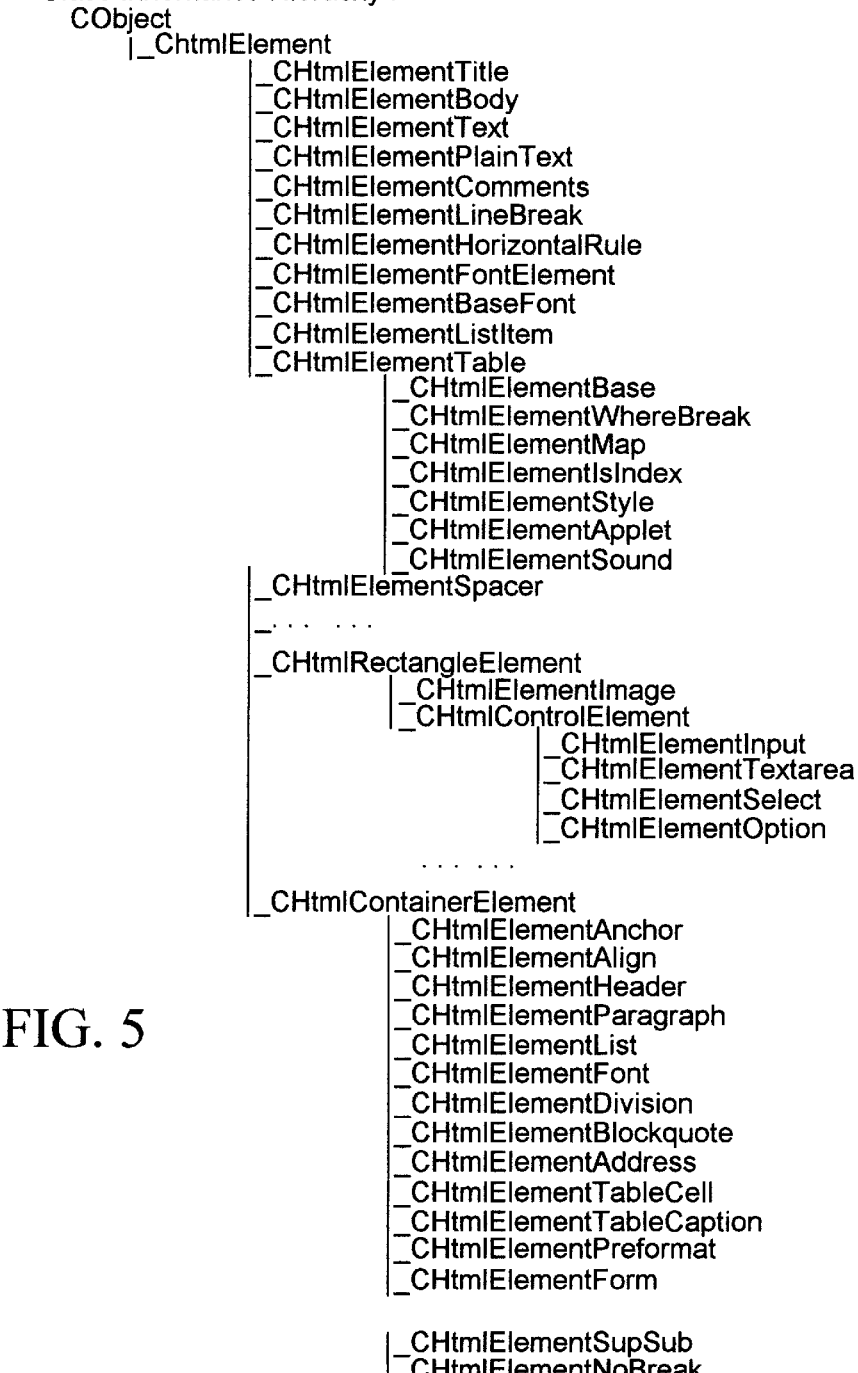
FIG. 5
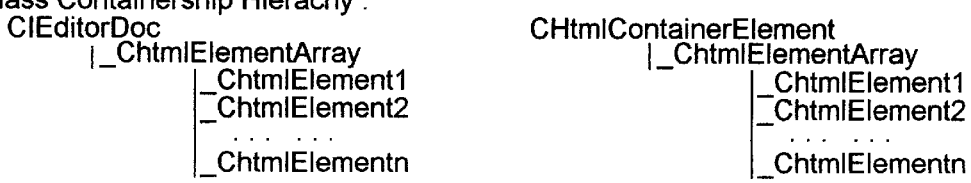

SYSTEM AND PROCESS FOR OBJECT RENDERING ON THIN CLIENT PLATFORMS

COPYRIGHT DISCLAIMER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention generally relates to a method of providing full feature program processing according to a variety of standard language codes such as HTML, JAVA and other standard languages, for execution on a thin client platform. More particularly the invention relates to methods for compiling and rendering full feature standard HTML and JAVA programs into a format which is efficient for a limited processing resource platforms.

2. Description of Related Art

Standard HTML and JAVA programs, and other hypertext languages, are designed for computers having a significant amount of data processing resources, such as CPU speed and memory bandwidth, to run well. One feature of these object specifying languages is the ability to specify a graphic object for display using relative positioning. Relative positioning enables the display of the graphic object on displays having a wide range of dimensions, resolutions, and other display characteristics. However, relative positioning of graphic objects requires that the target device have computational resources to place the graphic object on the display at specific coordinates. Thus, there are a number of environments, such as TV set top boxes, hand held devices, digital video disk DVD players, compact video disk VCD players or thin network computer environments in which these standard object specifying languages are inefficient or impractical. The original HTML and JAVA programs run very slowly, or not at all, in these types of thin client environments. To solve these problems, simpler versions of HTML and JAVA have been proposed, which have resulted in scripting out some of the features. This trades off some of the nice functionality of HTML and JAVA, which have contributed to their wide acceptance. Furthermore, use in thin client environments of the huge number of files that are already specified according to these standards, is substantially limited.

SUMMARY OF THE INVENTION

The present invention provides a system and method for processing an Display object specified by an object specifying language such as HTML, JAVA or other languages relying on relative positioning, that require a rendering program utilizing a minimum set of resources, for use in a target device that has limited processing resources unsuited for storage and execution of the HTML rendering program, JAVA virtual machine, or other rendering engine for the standard. Thus, the invention can be characterized as a method for storing data concerning such an object that includes first receiving a data set specifying the object according to the object specifying language, translating the first data set into a second data set in an intermediate object language adapted for a second rendering program suitable for rendering by the target device that utilizes actual target display coordinates. The second data set is stored in a machine readable storage device, for later retrieval and execution by the thin client platform.

The object specifying language according to alternative embodiments comprises a HTML standard language or other hypertext mark up language, a JAVA standard language or other object oriented language that includes object specifying tools.

The invention also can be characterized as a method for sending data concerning such an object to a target device having limited processing resources. This method includes receiving the first data set specifying the object according to the first object specifying language, translating the first data set to a second data set in an intermediate object language, and then sending the second data set to the target device. The target device then renders the object by a rendering engine adapted for the intermediate object language. The step of sending the second data set includes sending the second data set across a packet switched network such as the Internet or the World Wide Web to the target device. Also, the step of translating according to one aspect of the invention includes sending the first data set across a packet switched network to a translation device, and executing a translation process on the translation device to generate the second data set. The second data set is then transferred from the translation device, to the target device, or alternatively from the translation device back to the source of the data, from which it is then forwarded to the target device.

According to other aspects of the invention, the step of translating the first data set includes first identifying the object specifying language of the first data set from among a set of object specifying languages, such as HTML and JAVA. Then, a translation process is selected according to the identified object specifying language.

According to yet another aspect of the invention, before the step of translating the steps of identifying the target device from among a set of target devices, and selecting a translation process according to the identified target device, are executed.

In yet another alternative of the present invention, a method for providing data to a target device is provided. This method includes requesting for the target device a first data set from a source of data, the first data set specifying the object according to the object specifying language; translating the first data set to a second data set in an intermediate language adapted for execution according to a second rendering program by the target device. The second data set is then sent to this target device. This allows a thin platform target device to request objects specified by full function HTML, JAVA and other object specifying languages, and have them automatically translated to a format suitable for rendering in the thin environment.

Thus, the present invention provides a method which uses a computer to automatically compile standard HTML, JAVA and other programs so that such programs can run both CPU and memory efficiently on a thin client platform such as a TV set top box, a VCD/DVD player, a hand held device, a network computer or an embedded computer. The automatic compilation maintains all the benefits of full feature HTML and JAVA or other language.

The significance of the invention is evident when it is considered that in the prior art, standard HTML and JAVA were reduced in features or special standards are created for the thin client environment. Thus according to the prior art approaches, the standard programs and image files on the Internet need to be specially modified to meet the needs of special thin client devices. This is almost impossible considering the amount of HTML and JAVA formatted files on the Web. According to the invention each HTML file, compiled JAVA class file or other object specifying language data set is processed by a standard full feature HTML browser JAVA virtual machine, or other complementary rendering engine, optimized for a target platform on the fly, and then output into a set of display oriented language codes which can be easily executed and displayed on a thin client platform. Furthermore, the technique can use in general to speed up the HTML and JAVA computing in standard platforms.

Other aspects and advantages of the present invention can be seen upon review of the figures, the detailed description and the claims which follow.

BRIEF DESCRIPTION OF THE FIGURES

FIG. 5 is a class inheritance hierarchy for a precompiler for HTML.

DETAILED DESCRIPTION

Figure 1:
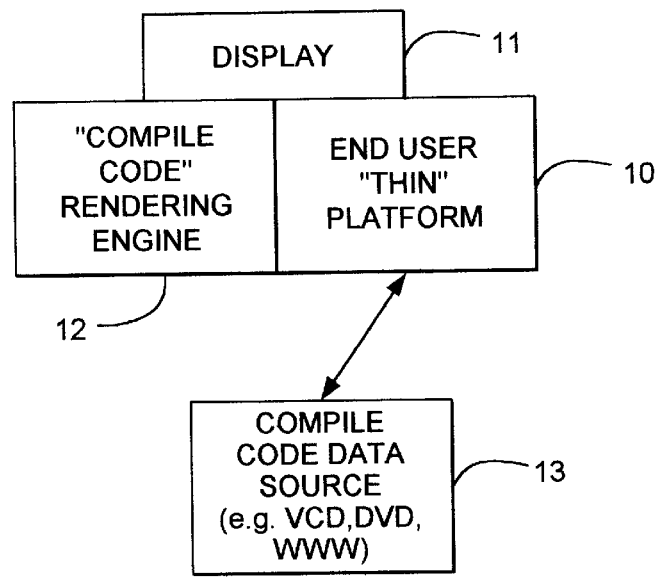
FIG. 1 is a simplified diagram of a end user thin platform for execution of a compiled code data source according to the present invention.
Figure 2:
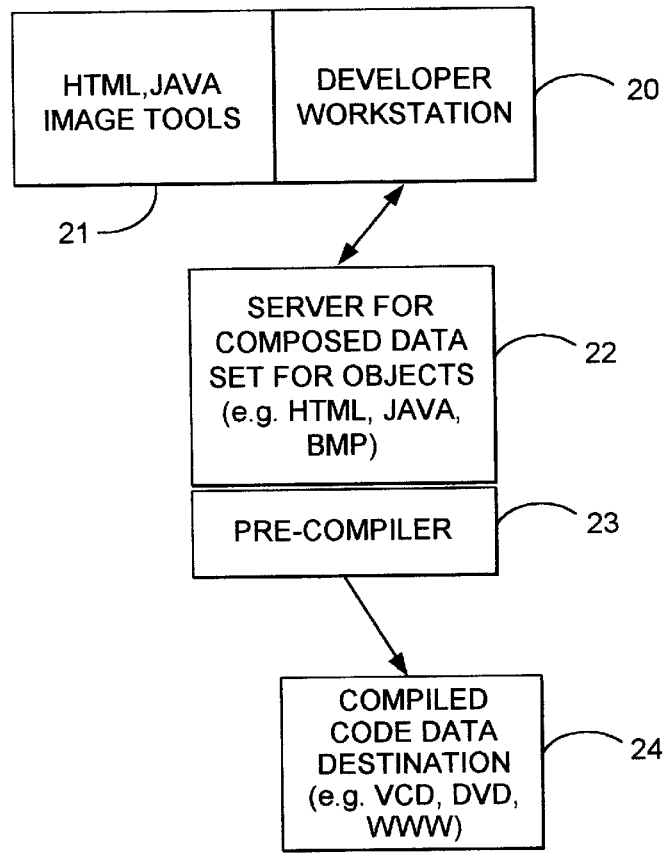
FIG. 2 is a simplified diagram of a user workstation and server for precompiling a composed data set according to the present invention.

A detailed description of preferred embodiments of the present invention is provided with respect to FIGS. 1–12A and 12B. FIGS. 1–2 illustrated simplified implementation of the present invention. FIGS. 3–9 and 9A illustrate processes executed according to the present invention. FIGS. 10–12A and 12B illustrate the use of the present invention in the Internet environment or other packet switched network environment.

FIG. 1 illustrates a "thin" platform which includes a limited set of data processing resources represented by box 10, a display 11, and a "compiled code" rendering engine 12 for a display oriented language which relies on the data processing resources 10. The end user platform 10 is coupled to a compiled code data source 13. A compiled code data sources comprises, for example a VCD, a DVD, or other computer readable data storage device. Alternatively, the compiled code data source 13 consists of a connection to the World Wide Web or other packet switched or point-to-point network environment from which compiled code data is retrieved.

The limited data processing resources of the thin platform 10 include for example a microcontroller and limited memory. For example, 512k of RAM associated with a 8051 microcontroller, or a 66 MHz MIPS RISC CPU and 512k of dynamic RAM may be used in a representative thin platform. Other thin user platforms use low cost microprocessors with limited memory. In addition, other thin platforms may comprise high performance processors which have little resources available for use in rendering the compiled code data source. Coupled with the thin platform is a compiled code rendering engine 12. This rendering engine 12 is a relatively compact program which runs efficiently on the thin platform data processing resources. The rendering engine translates the compiled code data source data set into a stream of data suitable for the display 11. In this environment, the present invention is utilized by having the standard HTML or JAVA code preprocessed and compiled into a compiled HTML/JAVA format according to the present invention using the compiler engine described in more detail below on a more powerful computer. The compiled HTML/JAVA codes are saved on the storage media. A small compiled HTML/JAVA run time engine 12 is embedded or loaded into the thin client device. The run time engine 12 is used to play the compiled HTML/JAVA files on the thin platform 10. This enables the use of a very small client to run full feature HTML or JAVA programs. The machine can be used both online, offline or in a hybrid mode.

FIG. 2 illustrates the environment in which the compiled code data is generated according to the present invention. Thus for example, a developer workstation 20 is coupled with image rendering tools such as HTML, JAVA, or other image tools 21. The workstation 20 is coupled to a server for the composed data 22. The server includes a precompiler 23 which takes the composed data and translates it into the compiled code data. Compiled code data is then sent to a destination 24 where it is stored or rendered as suits the needs of a particular environment. Thus for example, the destination may be a VCD, DVD or the World Wide Web.

According to the environment of FIG. 2 compiled HTML and JAVA "middleware" is implemented on an Internet server. Thus the thin set top box or other compiled code data destination 24 is coupled to the Internet/Intranet through the compiled HTML/JAVA middleware 22, 23. A small compiled HTML/JAVA run time engine is embedded in the thin destination device. All the HTML/JAVA files created in the workstation 20 go through the middleware server 22 to reach the thin client devices. The HTML/JAVA files are converted to the compiled format on the fly by the precompiler 23 on the middleware server 22. The server 22 passes the compiled code onto the destination device. This allows for most software updates of precompiler techniques to be made in the server environment without the need to update the destination devices. Also, any changes in the run time engine that need to be executed in the destination device 24 can be provided through the link to the server 22.

Figure 3:
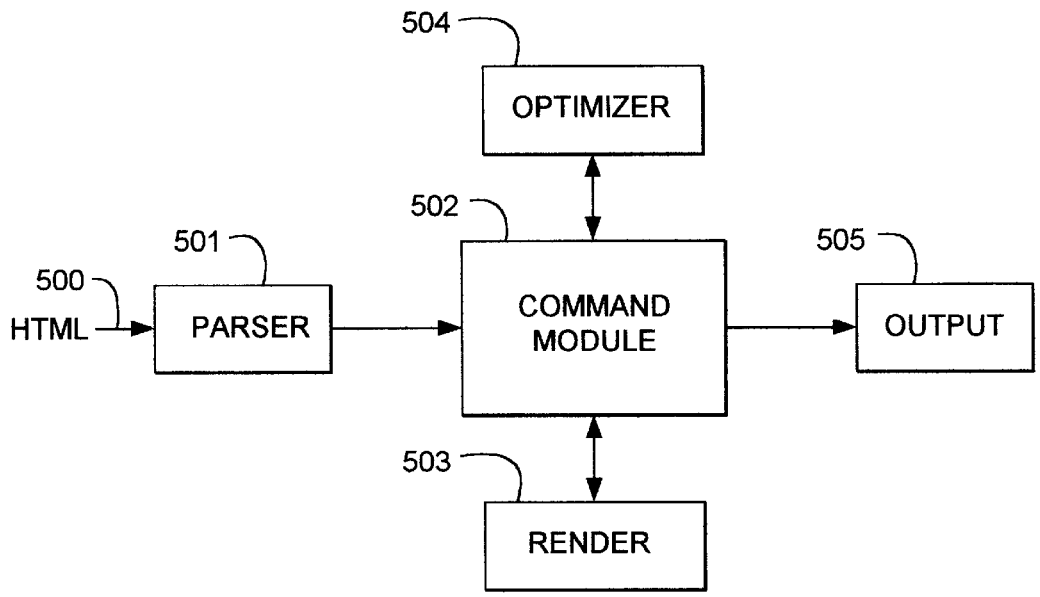
FIG. 3 is a simplified diagram of a precompiler for a HTML formatted file.
Figure 4:
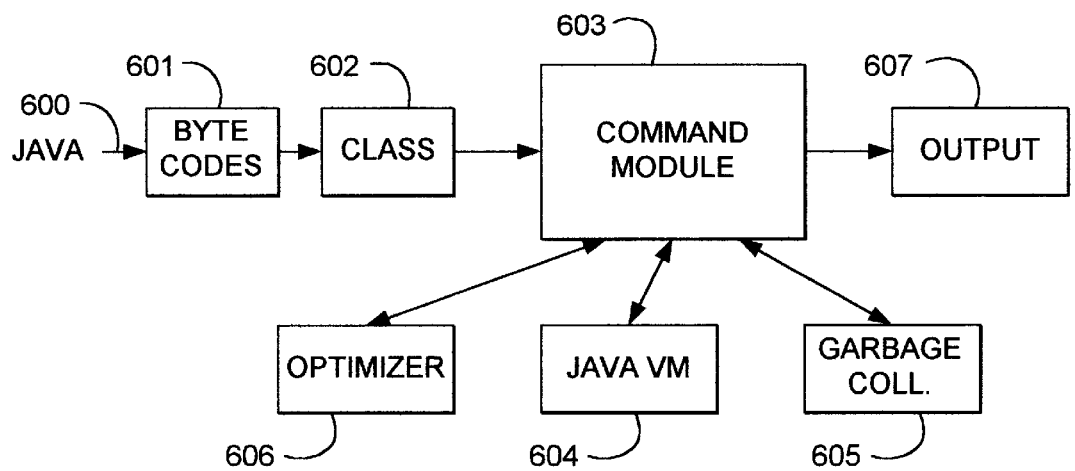
FIG. 4 is a simplified diagram of a precompiler for a JAVA coded program.

FIGS. 3 and 4 illustrate simplified diagrams of the precompilers for HTML and JAVA respectively. In FIG. 3, standard HTML files are received at input 500 and applied to a HTML parser 501. The output of the parser is applied to a command module 502 which includes a HTML rendering engine 503, and memory resident HTML objects optimizing engine 504. The output consists of the compiled HTML output engine 505 generates the output with simplified graphics primatives.

Figure 6:
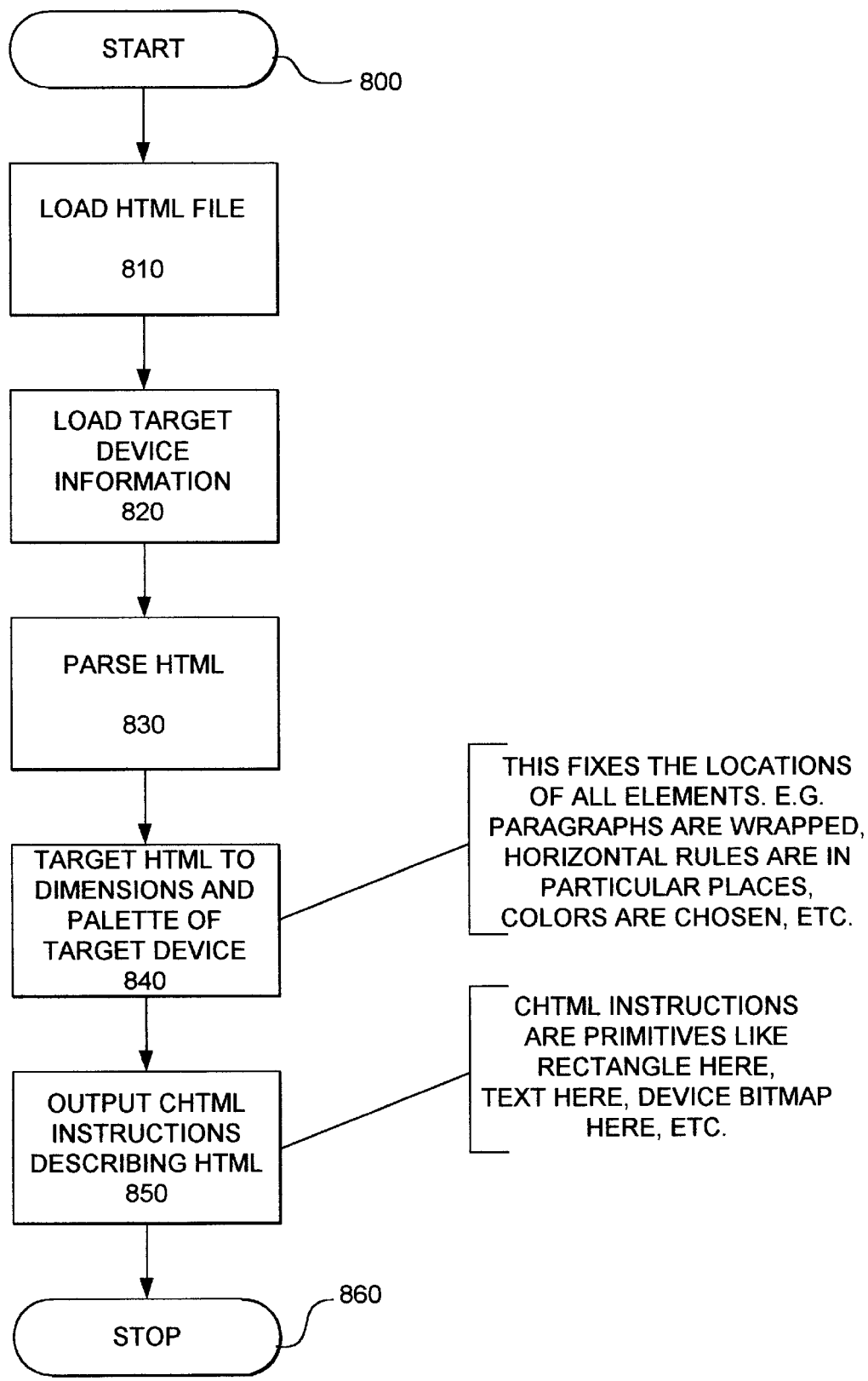
FIG. 6 is a flow chart for the HTML precompiler process.

The basic class inheritance hierarchy for the HTML precompiling is shown in FIG. 5. The process of translating a HTML file to the compiled HTML structure of the present invention is illustrated in FIG. 6. The process begins at point 800 in FIG. 6. The first step involves loading the HTML file into the rendering device. Next information concerning the target device is loaded (step 820). The HTML file is then parsed by searching for HTML tags, and based on such tags creating the class structure of FIG. 5 (step 830).

Using the parameters of the target device, and the parsing class structure set up after the parsing process, the algorithm does HTML rendering based on a class hierarchy adapted to the dimensions and palette of the target device (step 840). This fixes the coordinates of all the graphic objects specified by the HTML code on the screen of the target device. For example, the paragraphs are word wrapped, horizontal rules are placed in particular places, the colors are chosen, and other device specific processes are executed.

After the rendering, all the display information is saved back into the class structure of FIG. 5. Finally the process goes through the class hierarchy and outputs the rendering information in compiled HTML format (step 850). The compiled HTML instructions are primitives that define rectangles, text, bitmaps and the like and their respective locations. After outputting the compiled instructions, the process is finished (step 860).

A simplified pseudo code for the HTML compilation process is provided in Table 1.

TABLE 1

Copyright EnReach 1997

```
function convert_html (input : pointer) : chtmlfile;
        // this takes a pointer to an HTML file and translates it into a CHTML binary file
begin
        deviceInfo := LoadDeviceInfo( );   // Loads size and colors of target device
        Parse HTML file                    // use a parser to break the HTML file up into
                                           // tags represented in a fashion suitable for display
        For each HTML tag (<IMG . . . > = 1 tag, <P> a paragraph </P> = 1 tag),
    select a sequence of CHTML instructions to render the tag on the output device.
    As instructions are selected, colors and positioning are optimized based on the
    device size and palette.
                CHTML instructions include:
                        TITLE              string
                        TEXT               formatted text at a specific position,
                                           complex formatting will
                                           require multiple CHTML TEXT instructions
                        IMAGE              image information including image-map,
                                           animation info, image data
                        ANCHOR             HTML reference
                Basic geometric instructions such as: SQUARE, FILLEDSQUARE, CIRCLE,
                FILLEDCIRCLE, and LINE, permit the complex rendering required by some
                HTML instructions to be decomposed into basic drawing instructions. For
                example, the bullets in front of lists can be described in CHTML instructions
                as squares and circles at specific locations.
                CHTML instructions including TEXT and IMAGE instructions can be
                contained within anchors. The CHTML compiler must properly code all
                instructions to indicate if an instruction is contained in an anchor.
        The CHTML instructions can then be written to the output file along with some header
        information.
end;
```

Table 2 sets forth the data structure for the precompiling process.

TABLE 2

Copyright EnReach 1997

```
/* HTML font structure */
typedef struct tagHTMLFont
{
    char name[64];
    int size;
    int bold;
    int italic;
    int underline;
    int strikeout;
} HTMLFont;
/* FG point structure */
typedef struct tagFGPoint
```

TABLE 2-continued

Copyright EnReach 1997

```
{
    int fX;
    int fY;
} FGPoint;
/* FG rectangle structure */
typedef struct tagFGRect
{
    int fLeft;
    int fTop;
    int fRight;
    int fBottom;
} FGRect;
/* html node types, used by hType attribute in HTML_InfoHead structure */
#define HTML_TYPE_TITLE        0      /* title of the html page */
#define HTML_TYPE_TEXT         1      /* text node */
#define HTML_TYPE_CHINESE      2      /* chinese text node */
#define HTML_TYPE_IMAGE        3      /* image node */
#define HTML_TYPE_SQUARE       4      /* square frame */
#define HTML_TYPE_FILLEDSQUARE 5      /* filled square */
#define HTML_TYPE_CIRCLE       6      /* circle frame */
#define HTML_TYPE_FILLEDCIRCLE 7      /* filled circle */
#define HTML_TYPE_LINE         8      /* line */
#define HTML_TYPE_ANCHOR       9      /* anchor node */
#define HTML_TYPE_ANIMATION    10     /* animation node */
#define HTML_TYPE_MAPAREA      11     /* client side image map area node */
/* header info of compiled html file */
typedef struct tagHTML_FileHead
{
    unsigned int fBgColor;                /* background color index */
    unsigned int fPaletteSize;     /* size of palette */
} HTML_FileHead;
/* header info of each html node */
typedef struct tagHTML_InfoHead
{
    unsigned int hType;                   /* type of the node */
    unsigned int hSize;                   /* size of htmlInfo */
} HTML_InfoHead;
/* html info structure */
typedef struct tagHTML_Info
{
    HTML_InfoHead htmlHead;               /* header info */
    unsigned char htmlInfo[1];     /* info of the html node */
} HTML_Info;
/* html title structure */
typedef struct tagHTML_Title
{
    unsigned int textLen;                 /* length of text buffer */
    char textBuffer[1];                   /* content of text buffer */
} HTML_Title;
/* html text structure */
typedef struct tagHTML_Text
{
    FGPoint dispPos;                      /* display coordinates */
    int anchorID;                  /* anchor id if it's inside an anchor, −1 if not */
    HTMLFont textFont;                    /* font of the text */
    unsigned int textColor;        /* color index of the text */
    unsigned int textLen;          /* length of text buffer */
    char textBuffer[1];                   /* content of text buffer */
} HTML_Text
/* html chinese structure */
typedef struct tagHTML_Chinese
{
    FGPNT dispPos;                        /* display coordinates */
    int anchorID;                  /* anchor id if it's inside an anchor, −1 if not */
    unsigned int textColor;        /* color index of the text */
    unsigned int bufLen;           /* length of the bitmap buffer (16* 16) */
    char textBuffer[1];                   /* content of text buffer */
} HTML_Chinese;
/* html image structure */
typedef struct tagHTML_Image
{
    FGRect dispPos;                       /* display coordinates */
    int anchorID;                  /* anchor id if it's inside an anchor, −1 if not */
```

TABLE 2-continued

Copyright EnReach 1997

```
    int animationID;    /* animation id if it supports animation, -1 if not */
    int animationDelay;                 /* delay time for animation */
    char mapName[64];           /* name of client side image map, empty if no
image map */
    void *data;                         /* used to store image
data */
    unsigned int fnameLen;      /* length of the image file name */
    char fname[1];                      /* image filename */
} HTML_Image;
/* square structure */
typedef strnct tagHTML_Square
{
    FGRect dispPos;                     /* display coordinates */
    unsigned int borderColor;  /* border color index */
} HTML_Square;
/* filled square structure */
typedef struct tagHTML_FilledSquare
{
    FGRect dispPos;                     /* display coordinates */
    unsigned int brushColor;  /* the inside color index */
} HTML_FilledSquare;
/* circle structure */
typedef struct tagHTML_Circle
{
    FGRect dispPos;                     /* display coordinates */
    unsigned int borderColor;  /* border color index */
} HTML_Circle
/* circle structure */
typedef struct tagHTML_FilledCircle
{
    FGRect dispPos;                     /* display coordinates */
    unsigned int brushColor;  /* the inside color index */
} HTML_FilledCircle;
/* line structure */
typedef struct tagHTML_Line
{
    FGPoint startPos;                   /* line starting position */
    FGPoint endPos;                     /* line end position */
    int style;                          /* style of the line (solid, dashed, dotted,
etc.) */
    unsigned int penColor;              /* pen color index */
} HTML_Line;
/* anchor structure */
typedef struct tagHTML_Anchor
{
    int anchorID;                       /* id of the anchor */
    unsigned int hrefLen;.      /* length of href */
    char href[1];                       /* url of the anchor */
} HTML_Anchor;
/* animation structure */
typedef struct tagHTML_Animation
{
    int animationID;            /* id of the animation */
    unsigned int frameTotal;  /* total number of animation frames */
    long runtime;                       /* animation runtime */
} HTML_Animation;
#define SHAPE_RECTANGLE 0
#define SHAPE_CIRCLE 1
#define SHAPE_POLY 2
/* image map area structure */
typedef struct tagHTML_MapArea
{
    char mapName[64];                   /* name of client side image map
*/
    intshape;                           /* shape of the area */
    int numVer;                         /* number of vertix */
    int coords[6][2];         /* coordinates */
    unsigned int hrefLen;     /* length of href */
    char href[1];                       /* url the area pointed to */
} HTML_MapArea;
```

An example routine for reading this file into the thin platform memory follows in Table 3.

TABLE 3

Copyright EnReach 1997 reading this file:
```c
#define BLOCK_SIZE 256
/* returns number of nodes */
long read_chm(const char *filename,         /* input: .chm file name */
    HTML_Info ***ppNodeList, /* output: array of (HTML_Info *)
                                                including anchors. */
    YUVQUAD **ppPalette,                    /* output: page palette */
    unsigned int *palette_size)             /* output: palette size */
{
    int fd;
    char head[12];
    long total_nodes = 0;
    long max_nodes = 0;
    HTML_FileHead myFileHead;
    HTML_InfoHead myInfoHead;
    HTML_Info *pNodeInfo;
    void *pNodeData;
    long i;
    HTML_InfoHead *pHead;
    if (!ppNodeList || !ppPalette || !palette_size)
            return 0;
    (*ppNodeList) = NULL;
    (*ppPalette) = NULL;
    (*palette_size) = 0
    /* open file */
    fd = _open(filename,_O_BINARY|_O_RDONLY);
    if(fd < 0)
            return 0;
    /* read header and check for file type */
    if (_read(fd, head, 10) != 10)
    {
            _close(fd);
            return 0;
    }
    if (strncmp(head, "<COMPHTML>", 10))
    {
            _close(fd);
            return 0;
    }
    /* read file header */
    if(_read(fd, &myFileHead, sizeof(HTML_FileHead)) !=
sizeof(HTML_FileHead))
    {
            _close(fd);
            return 0;
    }
    (*palette_size) = myFileHead.fpaletteSize;
    /* read the palette */
    if ((*palette_size) > 0)
    {
            (*ppPalette) = (YUVQUAD *)malloc(sizeof(YUVQUAD)*
(*palette_size));
            if (_read(fd, (*ppPalette), sizeof(YUVQUAD) * (*palette_size))
                    != (int) (sizeof(YUVQUAD) * (*palette_size)))
            {
                    _close(fd);
                    return 0;
            }
    }
    /* read anchors along with other html nodes */
    while (1)
    {
            if (_read(fd, &myInfoHead, sizeof(HTML_InfoHead))
                    != sizeof(HTML_InfoHead))
            {
                    break;
            }
            if (myInfoHead.hSize > 0)
            {
                    pNodeInfo = (HTML_Info *) malloc(myInfoHead.hSize +
sizeof(HTML_InfoHead));
                    if (!pNodeInfo)
                            break;
                    memcpy(pNodeInfo, &myInfoHead,
sizeof(HTML_InfoHead));
                    if (_read(fd, &pNodeInfo[sizeof(HTML_InfoHead)],
myInfoHead.hSize)
```

TABLE 3-continued

Copyright EnReach 1997

```
                                        != (int)myInfoHead.hSize)
                        {
                                break;
                        }
                        /* check if we need to do memory allocation */
                        if (total_nodes >= max_nodes)
                        {
                                if(!max_nodes)
                                {
                                        /* no node in the list yet */
                                        (*ppNodeList) = (HTML_Info **)
malloc(
                                                sizeof(HTML_Info *)*
BLOCK_SIZE);
                                }
                                else
                                {
                                        (*ppNodeList) = (HTML_Info **)
realloc((*ppNodeList),
                                                max_nodes + sizeof(HTML_Info
*) * BLOCK_SIZE);
                                }
                                if (!(*ppNodeList))
                                        break;
                                max_nodes += BLOCK_SIZE;
                        }
                        (*ppNodeList)[total_nodes] = pNodeInfo;
                        total_nodes++;
                }
        }
        _close(fd);
        /* test our data */
        for (i = 0; i < total_nodes; i++)
        {
                pNodeInfo = (*ppNodeList)[i];
                pHead = (HTML_InfoHead *) pNodeInfo;
                pNodeData = pNodeInfo + sizeof(HTML_InfoHead);
                if(pHead->hType == HTML_TYPE_TEXT)
                {
                        HTML_Text *pText = (HTML_Text *) pNodeData;
                }
                else if(pHead->hType == HTML_TYPE_IMAGE)
                {
                        HTML_Image *pImage = (HTML_Image *) pNodeData;
                        if (pImage->fnameLen > 0)
                        {
                                /* load the image file */
                                pImage->data = load_ybm(pImage->fname);
                        }
                }
                else if (pHead->hType == HTML_TYPE_ANCHOR)
                {
                        HTML_Anchor *pAnchor = (HTML_Anchor *)
pNodeData;
                }
                else if(pHead->hType == HTML_TYPE_ANIMATION)
                {
                        HTML_Animation *pAnimation = (HTML_Animation *)
pNodeData;
                }
                else if(pHead->hType == HTML_TYPE_MAPAREA)
                {
                        HTML_MapArea *pMapArea = (HTML_MapArea *)
pNodeData;
                }
                else if (pHead->hType == HTML_TYPE_LINE)
                {
                        HTML_Line *pLine = (HTML_Line *) pNodeData;
                }
                else if(1)Head->hType == HTML_TYPE_SQUARE)
                {
                        HTML_Square *pSquare = (HTML_Square *) pNodeData;
                }
                else if(pHead->hType == HTML_TYPE_CIRCLE)
                {
                        HTML_Circle *pCircle = (HTML_Circle *) pNodeData;
                }
```

TABLE 3-continued

Copyright EnReach 1997

```
            else if (pHead->hType == HTML_TYPE_FILLEDSQUARE)
            {
                    HTML_FilledSquare *pFilledSquare =
(HTML_FilledSquare *) pNodeData;
            }
            else if (pHead->hType == HTML_TYPE_FILLEDCIRCLE)
            {
                    HTML_FilledCircle *pFilledCircle = (HTML_FilledCircle
*) pNodeData;
            }
            else if(pHead->hType == HTML_TYPE_TITLE)
            {
                    HTML_Title *pTitle = (HTML_Title *) pNodeData;
            }
    }
    return total_nodes;
}
```

Figure 7:
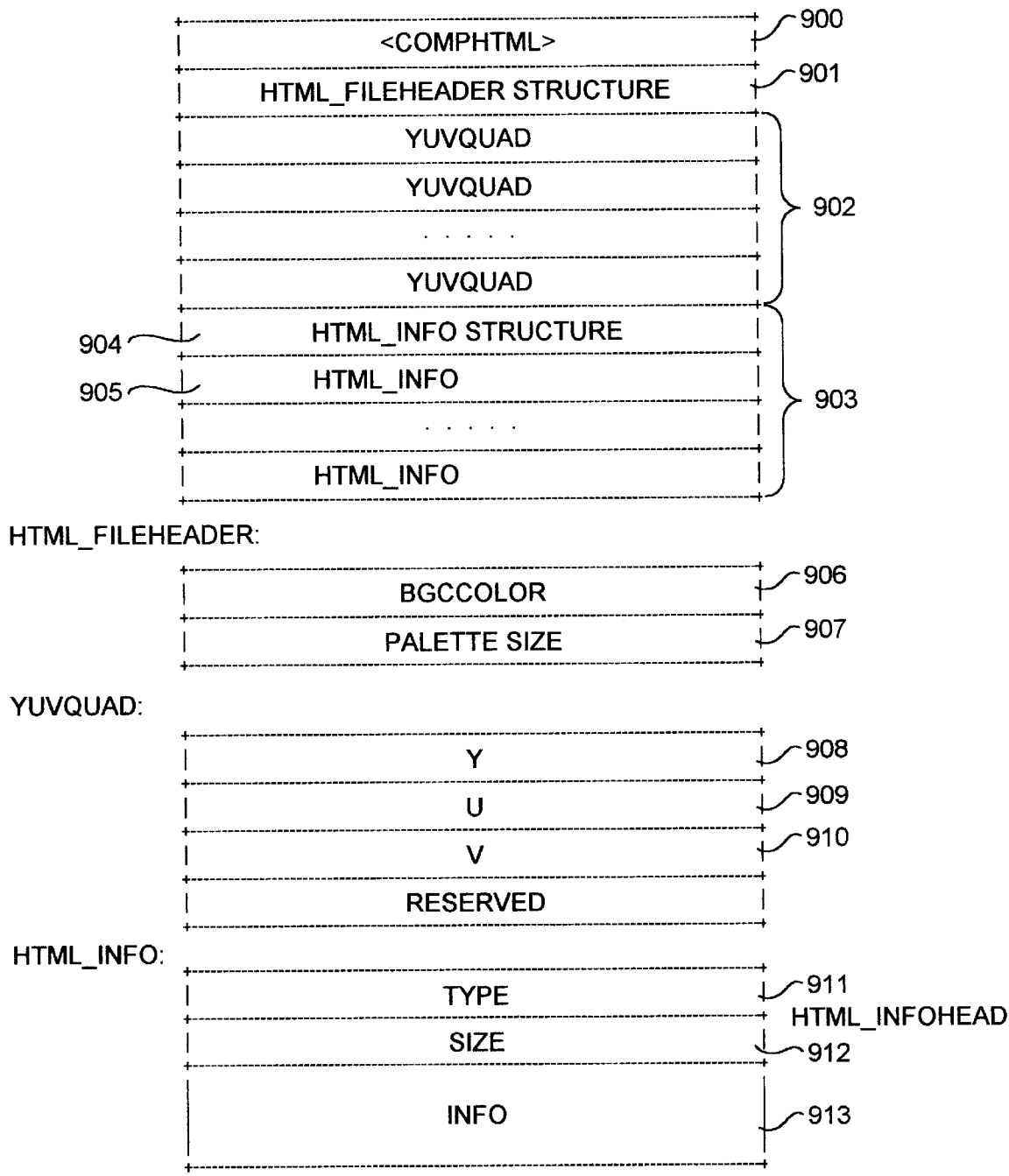
FIG. 7 illustrates the compiled HTML structure according to one embodiment of the present invention.

The compiled HTML file structure is set forth in FIG. 7 as described in Table 2. The file structure begins with a ten character string COMPHTML 900. This string is followed by a HTML file header structure 901. After the file header structure, a YUV color palette is set forth in the structure 902 this consists of an array of YUVQUAD values for the target device. After the palette array, a list 903 of HTML information structures follows. Usually the first HTML information structure 904 consists of a title. Next, a refresh element typically follows at point 905. This is optional. Next in the line is a background color and background images if they are used in this image. After that, a list of display elements is provided in proper order. The anchor node for the HTML file is always in front of the nodes that it contains. An animation node is always right before the animation image frames start. The image area nodes usually appear at the head of the list.

The HTML file header structure includes a first value BgColor at point 906 followed by palette size parameters for the target device at point 907. The YUVQUAD values in the color palette consist of a four word structure specifying the Y, U, and V values for the particular pixel at points 908–910. The HTML information structures in the list 903 consist of a type field 911, a size field 912, and the information which supports the type at field 913. The type structures can be a HTML_Title, HTML_Text, HTML_Chinese, HTML_Xxge, HTML_Square, HTML_FilledSquare, HTML_Circle, HTML_FilledCircle, HTML_Line, HTML_Author, HTML_Animation, . . .

Functions that would enable a thin platform to support viewing of HTML-based content pre-compiled according to the present invention includes the following:

General graphics functions
  int DrawPoint (int x, int y, COLOR color, MODE mode);
  int DrawLine (int x1, int y1, int x2, int y2, COLOR color, MODE mode);
  int DrawRectangle(int x1, int y1, int x2, int y2, COLOR color, MODE mode);
  int FillRectangle(int x1, int y1, int x2, int y2, COLOR color, MODE mode);
  int ClearScreen(COLOR color);
Color palette
  int ChangeYUVColorPalette( );
Bitmap function
  int BitBlt(int dst_x1, int dst_y1, int dst_x2, int dst_y2, unsigned char *bitmap, MODE mode);

String drawing functions
  int GetStringWidth(char *str, int len);
  int GetStringHeight(char *str, int len);
  int DrawStringOnScreen(int x, int y, char *str, int len, COLOR color, MODE mode);
Explanation
  All (x, y) coordinates are based on the screen resolution of the target display device (e.g. 320×240 pixels).
  COLOR is specified as an index to a palette.
  MODE defines how new pixels replace currently displayed pixels (COPY, XOR, OR, AND).
  Minimum support for DrawLine is a horizontal or vertical straight line, although it would be nice to have support for diagonal lines.
  The ChangeYUVColorPalette function is used for every page.
  BitBlt uses (x1, y1) and (x2, y2) for scaling but it is not a requirement to have this scaling functionality.
  String functions are used for English text output only. Bitmaps are used for Chinese characters.

Figure 8A:
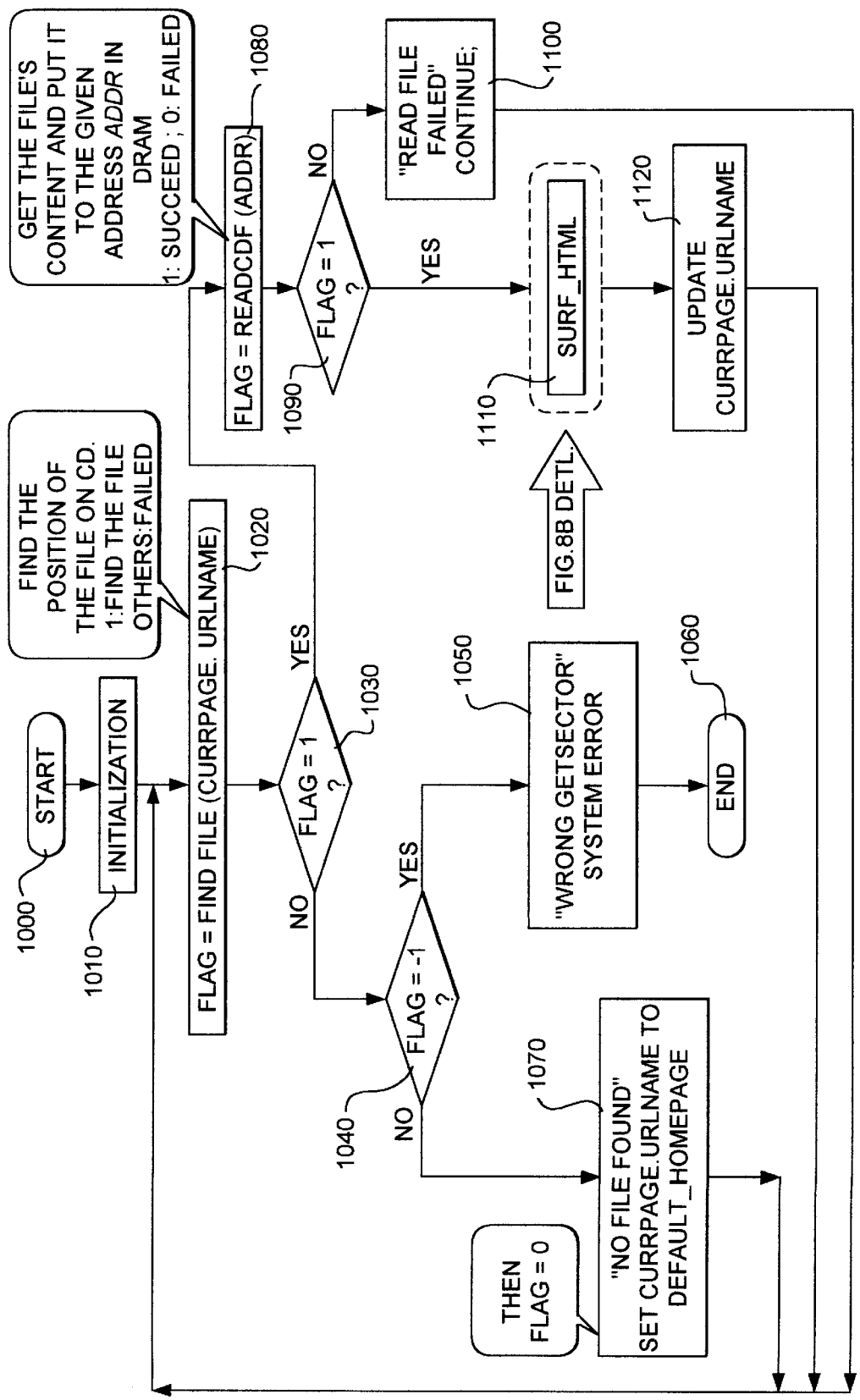
FIGS. 8A–8B illustrate a compiled HTML run time engine for execution on the thin platform according to the present invention.
Figure 8B:
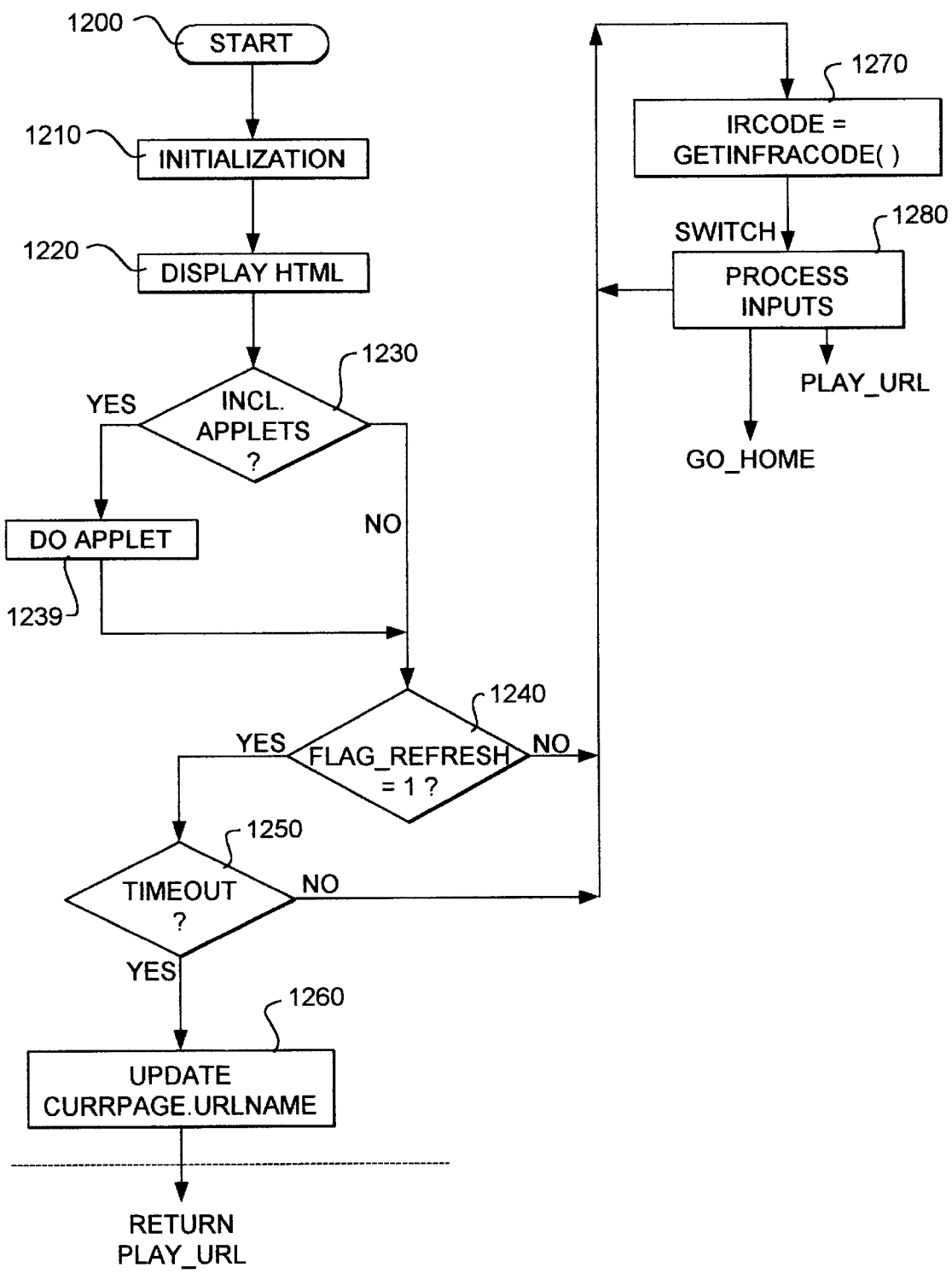

FIGS. 8A and 8B set forth the run time engine suitable for execution on a thin client platform for display of the compiled HTML material which includes the function outlined above in the "display" step 1220 of FIG. 8B.

The process of FIG. 8A starts at block 1000. The ran time engine is initialized on the client platform by loading the appropriate elements of the run time engine and other processes known in the art (step 1010). The next step involves identifying the position of the file, such as on the source CD or other location from which the file is to be retrieved and setting a flag (step 1020). The flag is tested at step 1030. If the flag is not set, then the algorithm branches to block 1040 at which the flag is tested to determine whether it is −1 or not. If the flag is −1, then the algorithm determines that a system error has occurred (step 1050) and the process ends at step 1060. If the flag at step 1040 is not −1, then the file has not been found (step 1070). Thus after step 1070 the algorithm returns to step 1020 to find the next file or retry.

If at step 1030, the flag is set to 1 indicating that the file was found, then the content of the file is retrieved using a program like that in Table 3, and it is stored at a specified address. A flag is returned if this process succeeds set equal to 1 otherwise it is set equal to 0 (step 1080). Next the flag is tested (step 1090). If the flag is not equal to 1 then reading of the file failed (step 1100). The process then returns to step 1020 to find the next file or retry.

If the flag is set to 1, indicating that the file has been successfully loaded into the dynamic RAM of the target device, then the "Surf_HTML" process is executed (step 1110). The details of this process are illustrated in FIG. 8B. Next the current page URL name is updated according to the HTML process (step 1120). After updating the current URL name, the process returns to step 1020 to find the next file.

FIG. 8B illustrates the "Surf_HTML" process of step 1110 in FIG. 8A. This process starts at point 1200. The first part is initialization step 1210. A display routine is executed at step 1220 having the fixed coordinate functions of the precompiled HTML data set. First, the process determines whether applets are included in the file (step 1230). If they are included, then the applet is executed (step 1240). If no applets are included or after execution of the applet, then a refresh flag is tested (step 1240). If the flag is equal to 1, then it is tested whether a timeout has occurred (step 1250). If a timeout has occurred, then the current page is updated (step 1260) and the process returns set 1210 of FIG. 8B, for example.

If at block 1240 the refresh flag was not equal to 1, or at block 1250 the timeout had not expired, then the process proceeds to step 1270 to get a user supplied input code such as an infrared input signal provided by a remote control at the target device code. In response to the code, a variety of process are executed as suits a particular target platform to handle the user inputs (step 1280). The process returns a GO_HOME, or a PLAY_URL command, for example, which result in returning the user to a home web page or to a current URL, respectively. Alternatively the process loops to step 1270 for a next input code.

As mentioned above, FIG. 4 illustrates the JAVA precompiler according to the present invention. The JAVA precompiler receives standard full feature JAVA byte codes as input on line 600. Byte codes are parsed at block 601. A JAVA class loader is then executed at block 602. The classes are loaded into a command module 603 which coordinates operations of a JAVA virtual machine 604, a JAVA garbage collection module 605, and a JAVA objects memory mapping optimizing engine 606. The output is applied by block 607 which consists of a compiled JAVA bytecode format according to the present invention.

Figures 9, 9A:
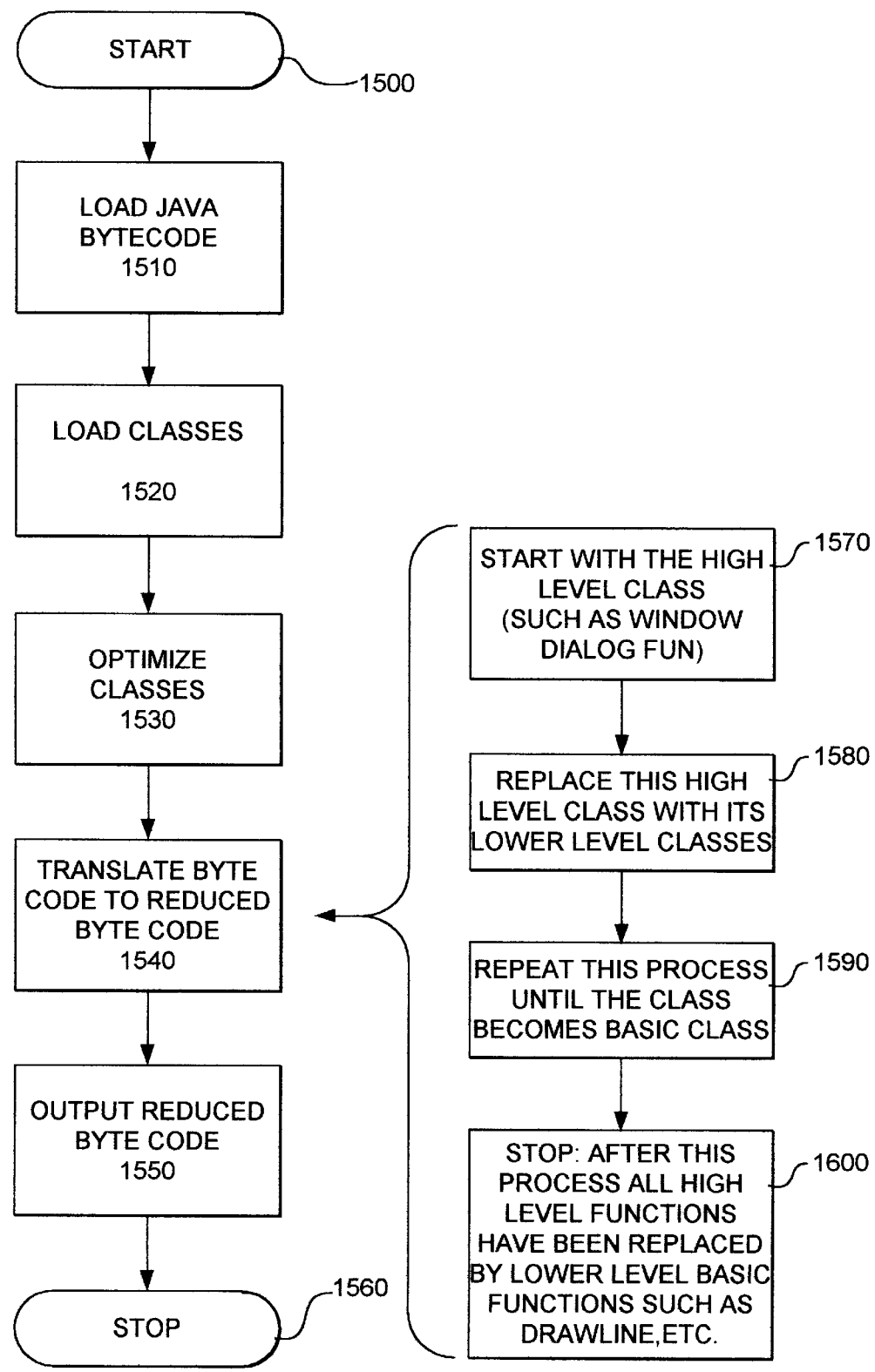
FIG. 9 is a flow chart of the process for precompiling a JAVA program according to the present invention.
FIG. 9A is a flow chart of one example process for translating the byte codes into a reduced byte code in the sequence of FIG. 9.

The process is illustrated in FIG. 9 beginning at block 1500. First the JAVA bytecode file is loaded (block 1510). Next, the JAVA classes are loaded based on the interpretation of the bytecode (step 1520). Next the classes are optimized at step 1530. After optimizing the classes, the byte codes are translated to a reduced bytecode (step 1540). Finally the reduced bytecode is supplied (step 1550) and the algorithm stops at step 1560. Basically the process receives a JAVA source code file which usually has the format of a text file with the extension JAVA. The JAVA compiler includes a JAVA virtual machine plus compiler classes such as SUN-.TOOLS.JAVAC which are commercially available from Sun Micro Systems. The JAVA class file is parsed which typically consists of byte codes with the extension .CLASS. A class loader consists of a parser and bytecode verifier and processes other class files. The class structures are processed according to the JAVA virtual machine specification, such as the constant pool, the method tables, and the like. An interpreter and compiler are then executed. The JAVA virtual machine executes byte codes in methods and outputs compiled JAVA class files starting with "Main". The process of loading and verifying classes involves first finding a class. If the class is already loaded a read pointer to the class is returned, if not, the class is found from the user specified class path or directory, in this case a flash memory chunk. After finding the class, the next step is executed. This involves loading the bytes from the class file. Next, class file bytes are put into a class structure suitable for run time use, as defined by the JAVA virtual machine specification. The process recursively loads and links the class to its super classes. Various checks and initializations are executed to verify and prepare the routine for execution. Next, initialization is executed for the method of the class. First the process ensures that all the super classes are initialized, and then cause the initialization method for the class. Finally, the class is resolved by resolving a constant pool entry the first time it is encountered. A method is executed with the interpreter and compiler by finding the method. The method may be in the current class, its super class or other classes as specified. A frame is created for the method, including a stack, local variables and a program counter. The process starts executing the bytecode instructions. The instructions can be stack operations, branch statements, loading/storing values, from/to the local variables or constant pool items, or invoking other methods. When an invoked method is a native function, the implemented platform dependent function is executed.

In FIG. 9A, the process of translating JAVA byte codes into compiled byte codes (step 1504 of FIG. 9) is illustrated. According to the process FIG. 9A, the high level class byte codes are parsed from the sequence. For example, Windows dialog functions are found (1570). The high level class is replaced with its lower level classes (1580). This process is repeated until all the classes in the file become basic classes (1590). After this process, all the high level functions have been replaced by lower level level basic functions, such as draw a line, etc. (1600).

JAVA byte codes in classes include a number of high level object specifying functions such as a window drawing function and other tool sets. According to the present invention, these classes are rendered by the precompiler into a set of specific coordinate functions such as those outlined above in connection with the HTML precompiler. By precompiling the object specifying functions of the JAVA byte code data set, significant processing resources are freed up on the thin client platform for executing the other programs carried in a JAVA byte code file. Furthermore, the amount of memory required to store the run time engine and JAVA class file for the thin client platform according to the present invention which is suitable for running a JAVA byte code file is substantially reduced.

Figure 10:
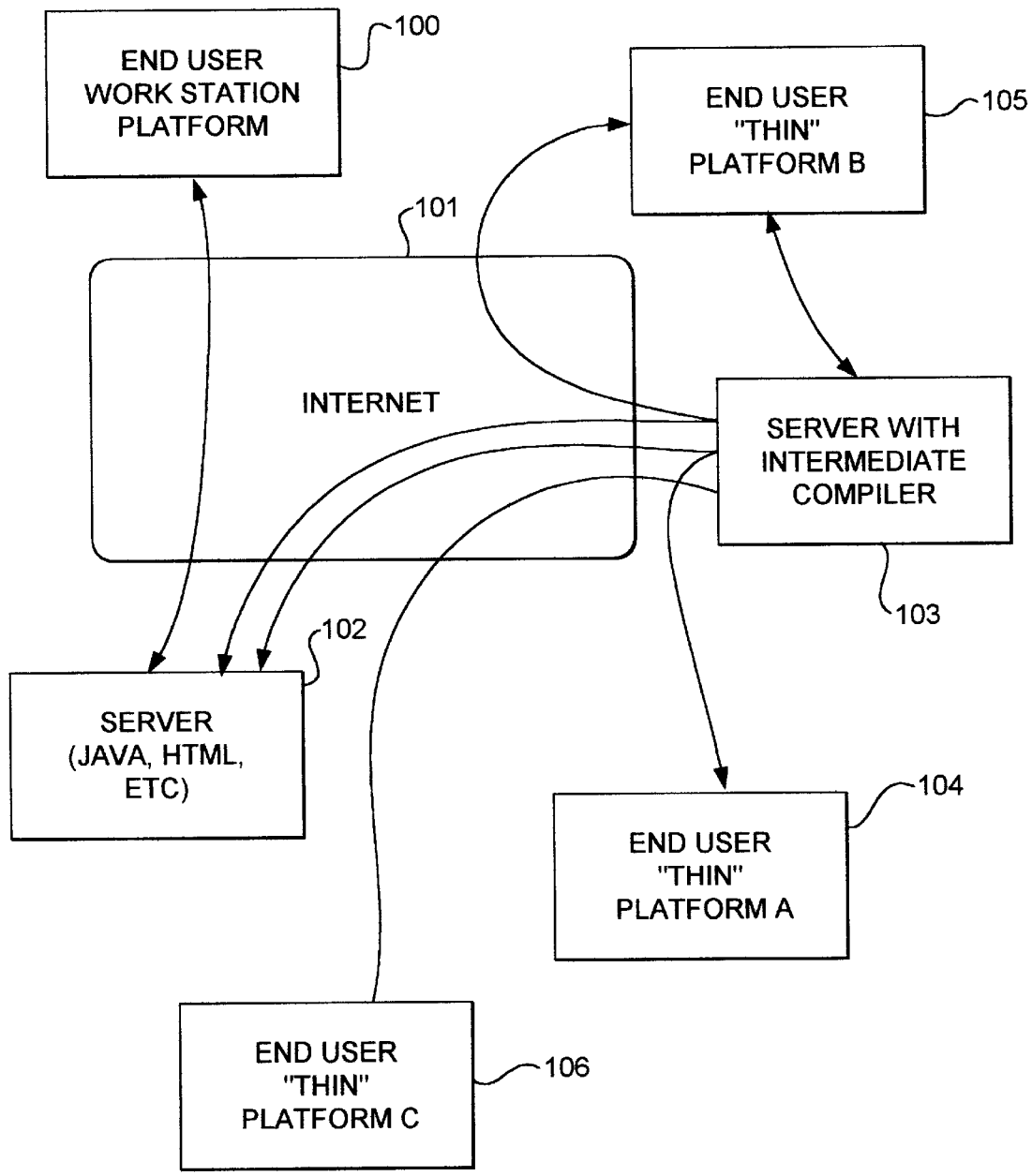
FIG. 10 is a schematic diagram illustrating use of the present invention in the Internet environment.

FIG. 10 illustrates one environment in which use of the present invention is advantageous. In particular, in the Internet environment a wide variety of platforms are implemented. For example, an end user workstation platform 100 is coupled to the Internet 101. An Internet server platform 102 is also coupled to the Internet 101 and includes storage for JAVA data sets, HTML data sets, and other image files. A server 103 with an intermediate compiler according to the present invention for one or more of the data sets available in the Internet is coupled to the Internet 101 as well. A variety of "thin" platforms are also coupled to the Internet and/or the server 103. For example, an end user thin platform A 104 is coupled to the server 103. End user thin platform B 105 is coupled to the server 103 and to the Internet 101. End user thin platform C 106 is coupled to the Internet 101 and via the Internet all the other platforms in the network. A variety of scenarios are thus instituted. The source of data sets for end user platform C 106 consists of the World Wide Web. When it requests a file from server 102, the file is first transferred to the intermediate compiler at server 103, and from server 103 to the end user platform 106. End user platform A 104 is coupled directly to the server 103. When it makes a request for a file, the request is transmitted to the server 103, which retrieves the file from its source at server 102, translates it to the compiled version and sends it to platform A 104. End user platform B is coupled to both the server 103 and to the Internet 101. Thus, it is capable of requesting files directly from server 102. The server 102 transmits the file to server 103 from which the translated compiled version is sent to platform B 105. Alternatively, platform B may request a file directly from server 103 which performs all retrieval and processing functions on behalf of platform B.

Figure 11:
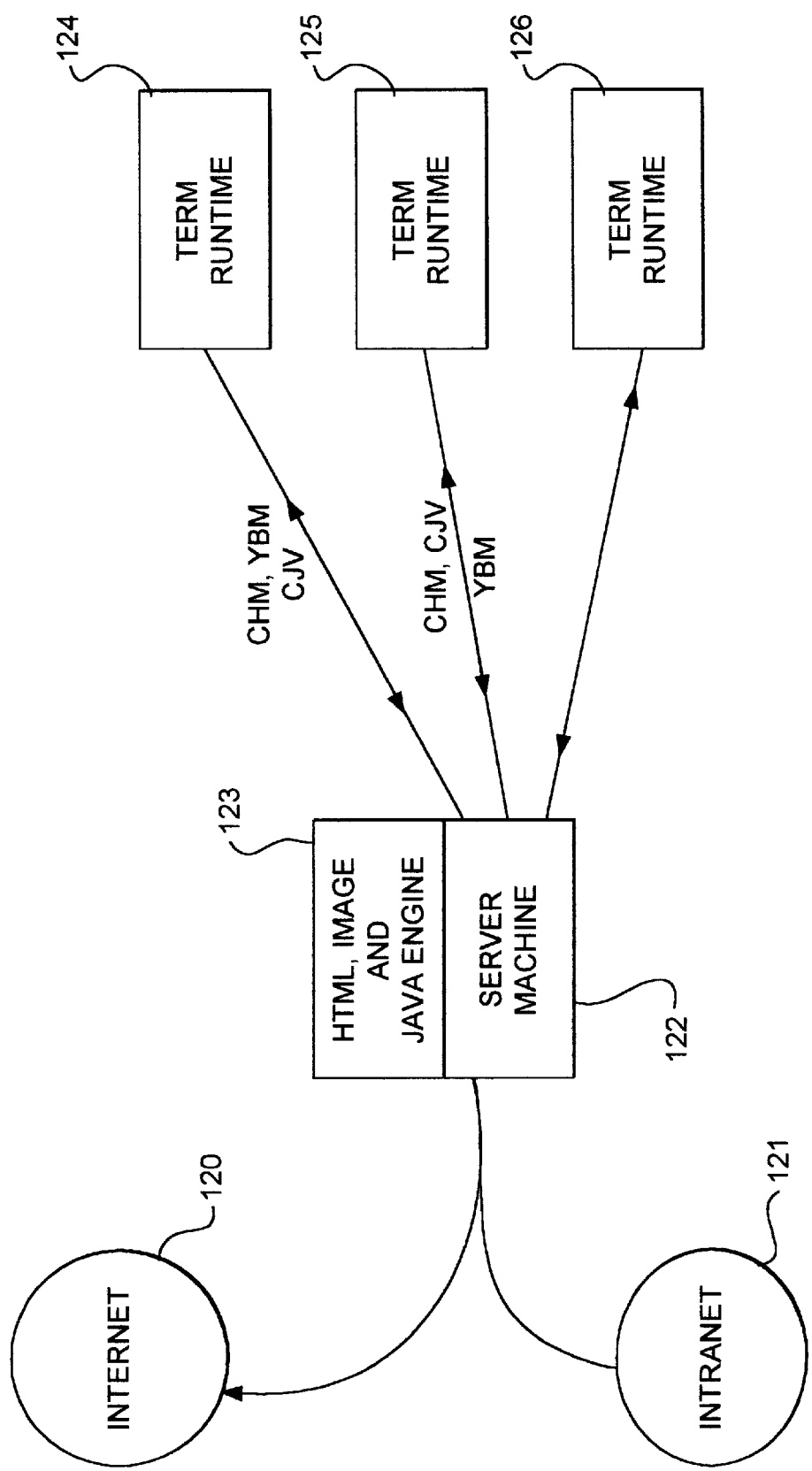
FIG. 11 is a schematic diagram illustrating use of the present invention in a "network computer" environment.

FIG. 11 illustrates an alternative environment for the present invention. For example, the Internet 120 and an Intranet 121 are connected together. A server 122 is coupled to the Intranet 121 and the Internet 120. The server 122 includes the HTML and JAVA intermediate compiling engines according to the present invention as represented by block 123. The server 122 acts as a source of precompiled data sets for thin client platforms 124, 125 and 126 each of which has a simplified run time engine suitable for the compiled data sets. Thus the powerful HTML/JAVA engine resides on the network server 122. The thin network computers 124, 125, 126 are connected to the server have only the simplified run time engine for the compiled image set. Thus, very small computing power is required for executing the display. Thus computing tasks are done using the network server, but displayed on a thin network computer terminals 124–126.

Figure 12A:
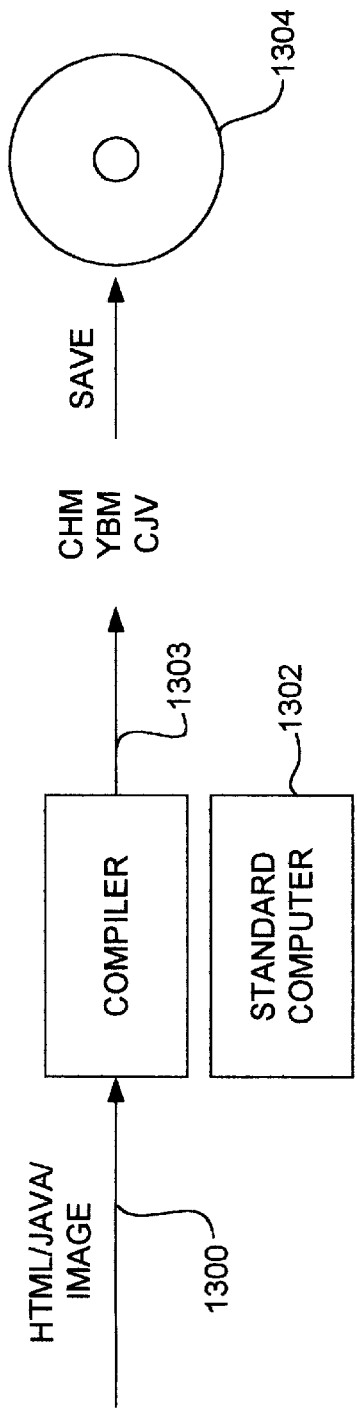
FIG. 12A is a schematic diagram illustrating use of the present invention in an off-line environment for producing a compiled format of the present invention and saving it to a storage medium.
Figure 12B:
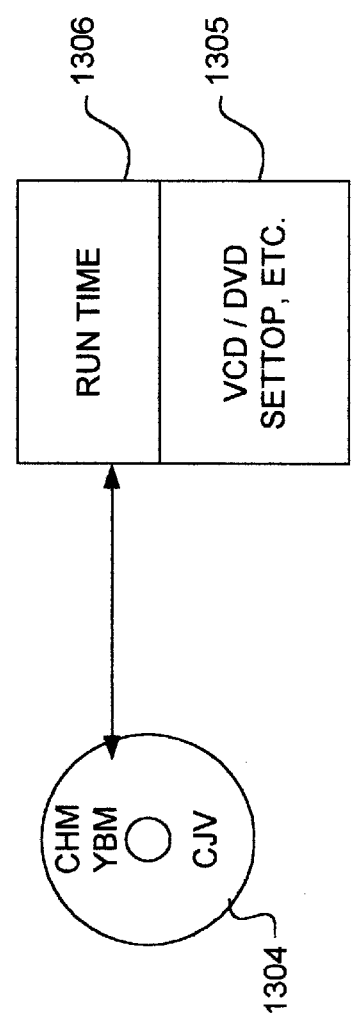
FIG. 12B illustrates the off-line environment in which the stored data is executed by thin platform.

FIGS. 12A and 12B illustrate the off-line environment for use of the present invention. In FIG. 12A, the production of the compiled files is illustrated. Thus, a standard object file, such as an HTML or JAVA image, is input online 1300 to a compiler 1301 which runs on a standard computer 1302. The output of the compiler on line 1303 is the compiled bitmap, compiled HTML or compiled JAVA formatted file. This file is then saved on a non-volatile storage medium such as a compact disk, video compact disk or other storage medium represented by the disk 1304.

FIG. 12B illustrates the reading of the data from the disk 1304 and a thin client such as a VCD box, a DVD box or a set top box 1305. The run time engine 1306 for the compiled data is provided on the thin platform 1305.

Thus, off-line fill feature HTML and JAVA processing is provided for a run time environment on a very thin client such as a VCD/DVD player. The standard HTML/JAVA objects are pre-processed and compiled into the compiled format using the compiler engine 1301 on a more powerful computer 1302. The compiled files are saved on a storage medium such as a floppy disk, hard drive, a CD-ROM, a VCD, or a DVD disk. A small compiled run time engine is embedded or loaded into the thin client device. The run time engine is used to play the compiled files. This enables use of a very small client for running full feature HTML and JAVA programs. Thus, the machine can be used in both online, and off-line modes, or in a hybrid mode.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method of translating a document on a first device for use on a second device, the document being in a standard HTML language, the method comprising:
reading the document;
reading a profile describing characteristics of the second device, the profile including a display resolution and a supported image format; and
translating the document on the first device according to the profile, the translating including
retrieving a plurality of images referenced by the document,
generating a color palette for the second platform using the plurality of images and the document,
executing the document according to the standard HTML language using the profile to generate a plurality of drawing instructions for displaying the document on the second device,
translating the plurality of images from respective formats to the supported image format, and
outputting a translated document, the translated document including at least a reference to the color palette, the plurality of images in the supported image format, and the plurality of drawing instructions.

2. The method of claim 1 wherein the reading the document further comprises retrieving the document from a world wide web (WWW) site based on a uniform resource locator (URL).

3. The method of claim 1 wherein the profile includes a maximum number of colors for the color palette.

4. The method of claim 3 wherein the generating the color palette using the plurality of images and the document comprises:
creating a set of colors comprised of all colors used in the plurality of images and all colors used in the document;
reducing the set of colors to contain no more than the maximum number of colors for the color palette.

5. The method of claim 1 wherein the document includes a plurality of references to a plurality of images, each of the plurality of references comprising a URL, and the retrieving a plurality of images referenced by the document further comprises retrieving respective images using the plurality of references.

6. The method of claim 1 wherein the executing the document according to the standard HTML language using the profile to generate a plurality of drawing instructions for displaying the document on the second device further comprises:
executing the document for display on the second device according to the display resolution;
positioning HTML elements in the document according to the display resolution;
word wrapping HTML text elements in the document according to the display resolution; and
generating a plurality of text drawing elements.

7. The method of claim 6 wherein the generating a plurality of text drawing elements further comprises generating a text element for each text segment, a text segment comprised of one or more characters from the document, the one or more characters sharing a font, a size, a style, and a color, and the text segment occupying not more than one line in the font at the size in the style, each text element including an absolute position at which the text segment should be displayed on the second device.

8. The method of claim 6 further comprising generating a plurality of graphics drawing elements including:

generating a plurality of line elements;

generating a plurality of rectangle elements; and generating a plurality of circle elements.

9. The method of claim 6 further comprising generating a plurality of link elements, each link element including a URL of a corresponding linked item.

10. The method of claim 1 wherein the supported image format includes a color palette indexed bitmap format and the translating the plurality of images from respective formats to the supported image format comprises:

decoding each of the plurality of images into a red-green-blue bitmap format;

selecting a color in the color palette for pixels in each of the plurality of images; and outputting a color palette indexed bitmap format for each of the plurality of images.

11. The method of claim 10 wherein the document comprises a plurality of Java classes, and wherein the executing the document according to the standard HTML language using the profile to generate a plurality of drawing instructions for displaying the document on the second device comprises:

loading and verifying the plurality of Java classes;

initializing methods associated with the plurality of Java classes; and replacing calls to complex drawing operations with a plurality of graphics drawing elements and a plurality of text drawing elements.

12. The method of claim 1 wherein the translated document includes a plurality of text elements and a plurality of graphics drawing elements.

13. The method of claim 1 wherein the standard HTML language comprises a Java language program.

14. The method of claim 1 wherein the translating the document on the first device for use on the second device further comprises:

receiving a request at the first device over a packet switched network from the second device, the request including a URL;

retrieving the document using the URL responsive to the request; and providing the translated document to the second device over the packet switched network.

* * * * *